United States Patent
Nir-Buchbinder et al.

(10) Patent No.: US 8,370,799 B2
(45) Date of Patent: Feb. 5, 2013

(54) PROVISION OF CODE BASE MODIFICATION USING AUTOMATIC LEARNING OF CODE CHANGES

(75) Inventors: Yarden Nir-Buchbinder, Mount Carmel (IS); Brian L. Peterson, Somers, NY (US); Christopher Ward, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/892,675

(22) Filed: Sep. 28, 2010

(65) Prior Publication Data

US 2012/0079452 A1 Mar. 29, 2012

(51) Int. Cl.
*G06F 9/44* (2006.01)
*G06F 17/00* (2006.01)

(52) U.S. Cl. ........ 717/110; 717/113; 717/120; 717/122; 706/45; 706/46; 706/47

(58) Field of Classification Search .................. None
See application file for complete search history.

(56) References Cited

U.S. PATENT DOCUMENTS

| | | | | |
|---|---|---|---|---|
| 7,110,936 | B2* | 9/2006 | Hiew et al. | 703/22 |
| 7,849,442 | B2* | 12/2010 | Hashizume et al. | 717/121 |
| 8,245,186 | B2* | 8/2012 | Gryko et al. | 717/110 |
| 8,271,939 | B1* | 9/2012 | Krishnaiyer et al. | 717/106 |
| 2002/0019971 | A1* | 2/2002 | Zygmont et al. | 717/1 |
| 2005/0229154 | A1* | 10/2005 | Hiew et al. | 717/110 |
| 2008/0320438 | A1* | 12/2008 | Funto et al. | 717/106 |
| 2010/0050154 | A1* | 2/2010 | Balasubramanian | 717/113 |
| 2010/0198799 | A1* | 8/2010 | Krishnan et al. | 707/702 |

OTHER PUBLICATIONS

Robbs, "Mining a Change-Based Software Repository," Fourth International Workshop on Mining Software Repositories (MSR'07), IEEE, 2007.*
Ying et al., "Predicting Source Code Changes by Mining Change History," IEEE Transactions on Software Engineering, vol. 30, No. 9, Sep. 2004.*

* cited by examiner

*Primary Examiner* — Insun Kang
(74) *Attorney, Agent, or Firm* — F. Chau & Associates, LLC; Louis J. Percello, Esq.

(57) ABSTRACT

A method for providing codebase modification assistance includes receiving training data including learning application code prior to modification and the same learning application code subsequent to modification, the modification being of a known type. Portions of the learning application code that have been changed by the modification are detected. One or more substrings are identified from names associated with the detected portions of the learning application code that have been changed. A target application code that is to be modified according to the known type of modification of the training data is received. The identified one or more substrings are searched for from names associated with portions of the received target application code. The portions of the target application code for which the one or more substrings have been found within associated names are displayed.

20 Claims, 4 Drawing Sheets

PROVISION OF CODE BASE MODIFICATION USING AUTOMATIC LEARNING OF CODE CHANGES

BACKGROUND OF THE INVENTION

1. Technical Field

The present disclosure relates to code modification and, more specifically, to the provision of code base modification using automatic learning of code changes.

2. Discussion of Related Art

There are many occasions in which code for a particular application needs to be reworked to satisfy particular requirements or concerns. For example, code may be reworked in order to migrate an application from one platform or environment to another platform or environment. Code may also be reworked in order to achieve parallelization, which is the ability for application threads to be handled in parallel by multiple microprocessors or microprocessor cores. Code may also be reworked to protect against certain types of security threats. In each of these cases, as well as with other types of code changes, there may be commonality between the way one application is reworked and the way other applications are reworked when the applications are reworked to satisfy the same requirements or concerns. For this reason programmers may often repeat the endeavor of determining which elements of the code need to be changed for each application under development, even when some of the underlined changes that go into satisfying the particular requirements or concerns may be similar from application to application.

SUMMARY

A method for providing codebase modification assistance includes receiving training data including at least one learning application code in two forms, the first form representing the learning application code prior to modification and the second form representing the same learning application code subsequent to modification, the modification being of a known type. Portions of the learning application code that have been changed by the modification are detected by comparing the first form of the learning application code with the second form of the learning application code. One or more substrings are identified from names associated with the detected portions of the learning application code that have been changed. A target application code that is to be modified according to the known type of modification of the training data is received. The identified one or more substrings are searched for from names associated with portions of the received target application code. The portions of the target application code for which the one or more substrings have been found within associated names are displayed.

A method for providing codebase modification assistance includes loading learning application code into a text editor, receiving a description of a type of code change to be performed on the loaded learning application code by a user, recording which portions of the learning application code are changed by the user as the user implements the code change of the described type, identifying one or more characteristics of the portions of the learning application code that are changed by the user as the user implements the code change of the described type, receiving a target application code that is to be changed according to the type of code change that the user implemented on the learning application code, and identifying and displaying portions of the target application code that exhibit the one or more identified characteristics.

A computer program product for providing codebase modification assistance includes a computer readable storage medium, program instructions for loading learning application code into a text editor, program instructions for receiving a description of a type of code change to be performed on the loaded learning application code by a user, program instructions for recording which portions of the learning application code are changed by the user as the user implements the code change of the described type, program instructions for identifying one or more substrings from names associated with the detected portions of the learning application code that have been changed by the user, program instructions for receiving a target application code that is to be modified according to the type of code change that the user implemented on the learning application code, program instructions for searching for the identified one or more substrings from names associated with portions of the received target application code, and program instructions for displaying the portions of the target application code for which the one or more substrings have been found within associated names.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
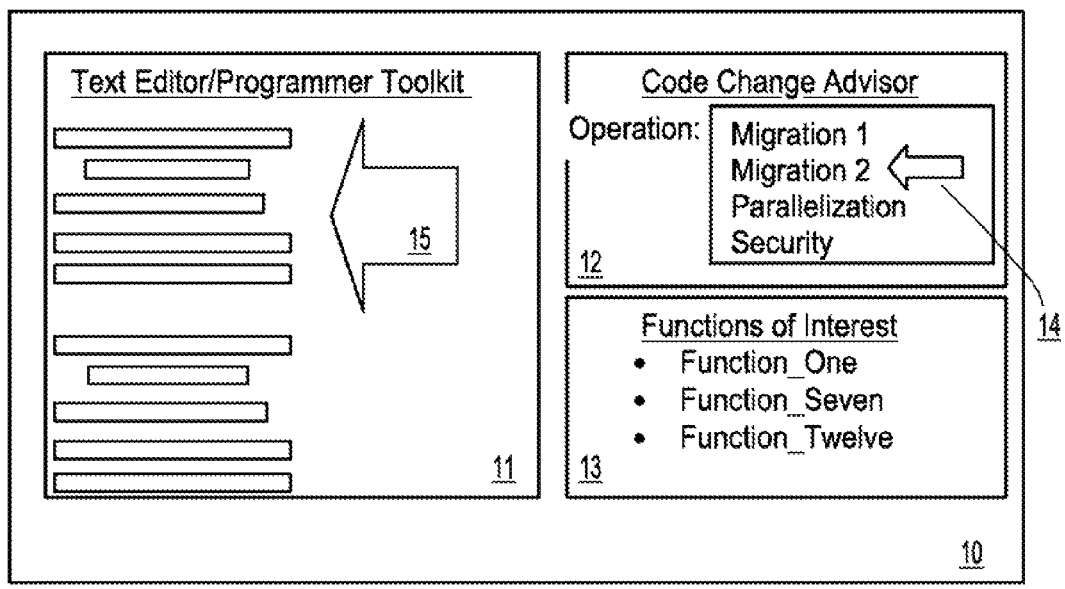
FIG. 1 is a diagram of a user interface element for performing code modification assistance according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide support for reprogramming of applications that are reworked to satisfy particular requirements or concerns. In particular, exemplary embodiments of the present invention may support reprogramming of code to achieve migration, parallelization, and/or to provide protection against particular classes of security threats.

Programming support may be provided either within an independent application or as part of a program development toolkit. For example, programming support may be implemented as a plug-in for a text editor, compiler, or other application development platform. As such, exemplary embodiments of the present invention may interact with the user using various dialog boxes, menus and the like so that user input may be solicited and proper support provided.

The invention is not, however, limited to providing support for the reprogramming of code to achieve migration, parallelization, and/or to provide protection against particular classes of security threats. Any form of modification that may be made for a defined purpose for which other applications may have also been modified may be assisted in accordance with exemplary embodiments of the present invention. For the purposes of providing a simple disclosure, however, exemplary embodiments of the present invention may be described herein with respect to providing migration support to migrate an application from one platform to another platform. For example, migration may include reworking an application designed to run on a mainframe computer for use on a personal computer.

In this context, support may include, but need not be limited to, the provision of suggested code changes to the programmer. These suggested code changes may include a checklist for the programmer indicating changes that may be required or desired, an indication as to places in the code base that may need to be updated, the names or locations of functions, libraries or other code elements that may need to be updated, suggested changes to function calls, etc. A detailed description of exemplary user interfaces for providing the above-described programming assistance is provided below with respect to FIG. 1.

Development support need not be limited to programmers; exemplary embodiments of the present invention may be directed towards providing suggestions to software testers, for example, indicating parts of the code base that may be sensitive to error and may require testing regardless of whether these sections of code were actually changed during the migration. Support may further be provided for testing estimation technology, such as test coverage, to focus the attention of the tester on particular aspects of program execution.

By providing such support, the experience of expert programmers and testers may be aided so that deficiencies and omissions of the experts may be compensated for and a high level of quality assured. However, the assistance provided thereby need not supplant human expertise and may thus provide support and advise that may be acted upon by the human user or simply overridden or ignored. The users may also intervene in the operation of the system and refine the manner in which the system operates so that subsequent implementations of the system may be enhanced.

Exemplary embodiments of the present invention may discover how to render migration assistance by the use of computer learning. In performing computer learning, a set of training data may be collected from the code base of prior applications that have been migrated. The training data may thus include both the source code prior to migration and the source code after migration. Exemplary embodiments of the present invention may analyze the training data to learn common changes and to learn which aspects of the code are commonly changed. Training data may be collected, for example, by the use of the same system that is used to provide assistance, for example, by the use of a plug-in to a development toolkit platform. Training data may be acquired by prompting a user to provide a selection as to the purpose of code modification so that after the user has modified the code, the prior code and final code may be used as training data for the modification selected by the user. For example, the user may be presented with a dialog box enquiring as to the reason for the code changes. The dialog box may include possible choices such as code migration, parallelization, security modification, etc. and the user may be prompted to choose between the available choices or enter a new category. In this way, a single system may be used for both the collection of the training data and the provision of advice.

Accordingly, exemplary embodiments of the present invention may be able to discover best practices and know-how from some users and transfer this knowledge to other users and/or to remind the same users of knowledge that they had previously exhibited. In this way, best practices and know-how may be efficiently disseminated among users and competences may be shared among groups of users while a consistent and high level of quality in code changing may be maintained.

Learning may include, for example, the collection of training data from a plurality of code changing projects, distilling common practices from the training data, and automatically applying these common practices, or suggesting that these practices be applied, to subsequent code changing projects of a similar type.

Distillation of common practices may include a determination as to which methods and/or functions have a tendency to be changed during the code changing project. In applying this knowledge to subsequent projects, commonalities between the methods and/or functions that have been changed may be searched for within the code base of the subsequent project. The result of this process may be to generate a list of code places likely to need changing. Commonalities may be located, for example, by the application of substring analysis.

Substring analysis may include the use of function names and comment text associated with functions as an indication of function purpose and thus functions with similar or identical strings from different application code may be assumed to be similar in purpose. Thus when it is determined that during a particular category of code change operation, functions prominently featuring a particular string (for example, in the function name, variable names and/or comment text) tend to be modified within the code base of prior projects, these strings may be searched for within the functions and/or methods of the current code being changed according to the same category of code change and those functions and/or methods that exhibit these particular strings prominently within the current code may be brought to the attention of the programmer performing the code change operation, for example, as a list of functions or by highlighting the actual code within a text editor or programming toolkit.

Figure 2:
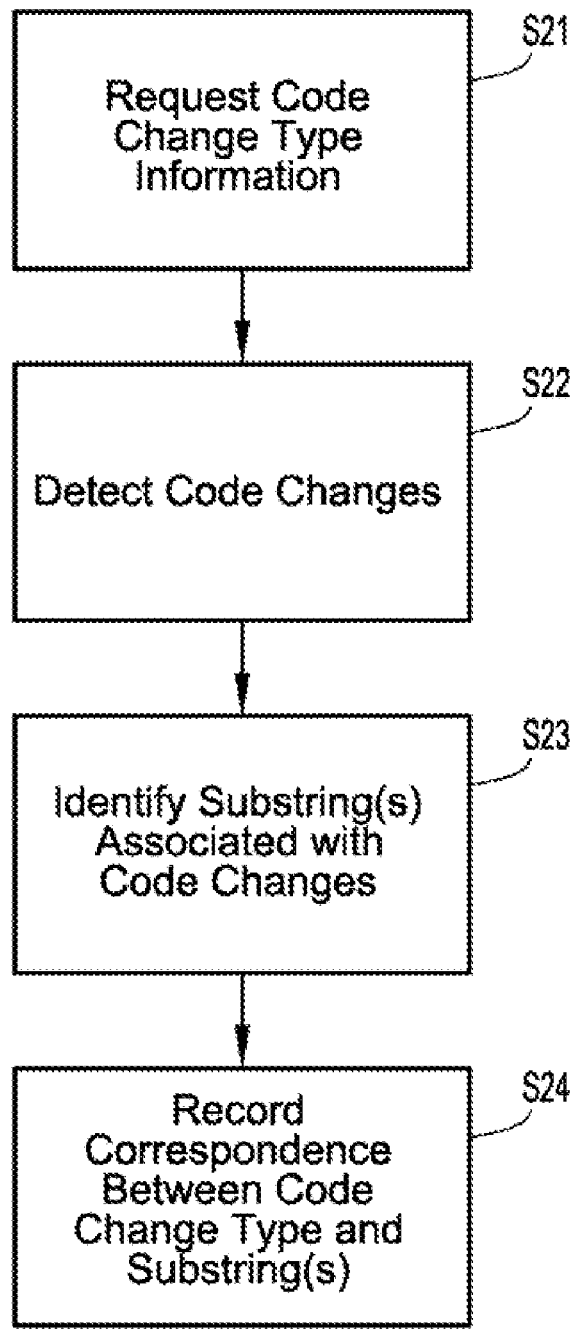
FIG. 2 is a flowchart illustrating a method for computer learning for detecting elements of code to change in association with a particular type of code change operation according to exemplary embodiments of the present invention.

As described above, exemplary embodiments of the present invention may be used first to learn how to detect elements of code that may be changed in association with a particular type of code change operation using learning code and then to identify elements of code that may be changed in target code. FIG. 2 is a flowchart illustrating a method for computer learning for detecting elements of code to change in association with a particular type of code change operation according to exemplary embodiments of the present invention. First, code change type information may be requested of the programmer/user (Step S21). As described above, code change type information is a description of the reason the code base is undergoing code changes. Examples of code change types include migration from one platform to another platform, parallelization, and for providing protection against a particular security threat.

It is to be understood that the above-listed code change types are general categories of code change types and not specific examples. A specific example of a code change type would be a migration of an application from version 1.0 of operating system XYZ to version 2.0 of operating system XYZ. Another example of a code change type would be reworking an application originally designed for execution on a system with a single-core CPU for execution on a multi-core CPU system. Another example of a code change type would be reworking an application that is vulnerable to security threat ABC so that the application is no longer vulnerable to security threat ABC.

In requesting that the code change information be provided (Step S21), exemplary embodiments of the present invention may present the user with a dialog box with which the user can select the desired code change type from among a list of known code change types (for example, a list of recently selected code change types) or the user can manually enter a description of a new code change type. As exemplary embodiments of the present invention may be implemented as part of a programming tool kit, the request for code change type may be presented to the user automatically, for example, when the user loads an existing code base for modification.

Once the code change type information has been provided by the user, the system may then monitor the loaded code base to detect code changes that the user may make (Step S22). A code change may be detected when the user begins to edit the text of a particular function or other section of code. Detection of the code change may include identifying which function or code section is being modified. Then, prominent substrings may be identified within the function or code section. Prominent substrings may include function names, variable names, comment text or other pertinent text. However, prominent substrings should not include generic programming commands that may be common to all code regardless of the purpose of the code. The identified substrings are associated with the code changes made. Every time it is detected that code changes are made (Step S22), substrings associated with those code changes may be identified (Step S23). These substrings may be searched throughout the code, and checked as to whether they are special to this changed code and other changed code, or whether conversely they are common also in unchanged code. In the latter case, they may be ignored. Identified substrings may be saved, for example, in a database of substrings. Where more than one substring are identified for code changes made to a single function or program section, this information may be noted and stored along with the substring information so that multiple substrings may be associated with a single type of change.

A human user may optionally review the stored sets of substrings to remove substrings that are believed to be non-informative such as common programming commands or other text that may not be indicative of a particular type of function or program element.

For example, where it is detected that a "Get_time_limit (x,t)" function is changed, identified substrings may include "get," "time," and "limit." The "get" substring will likely be identified as common in the code, appearing as much in unchanged code as in changed code, and therefore ignored. The other two substrings, or their combination, may be identified as typical to changed functions. These substrings may be associated with a single detected code change and stored accordingly.

Then, correspondence between the selected code change type and the identified substrings may be recorded (Step S24). For example, where the code change type was identified as "migration from OS-XYZ 1.0 to OS-XYZ 2.0" and the function "Get_time_limit(x,t)" was changed, identified substrings "get," "time," and "limit" may be associated with the particular code change type "migration from OS-XYZ 1.0 to OS-XYZ 2.0."

In this way the learning sets of code changes may be regarded as training data and may be collected and processed. However, exemplary embodiments of the present invention are not limited to collecting and processing learning sets at the time of the change, previously changed code may be analyzed after the fact to train the system for subsequent programmer assistance. For example, exemplary embodiments of the present invention may receive sets of code from before and after code changes were made. The sets of code may be compared to identify changes made to the code. Substrings associated with the code changes may be identified, and correspondences between the substrings and the code change type may be recorded. Generally, in such a case the code change type may be known.

Where changes in code are identified by comparing pre-change and post-change code, appropriate existing parsing tools may be used to parse each version of the code. Where the code is in binary form, the binary data may be compared or a decompiler may be used to approximate original source code.

Figure 3:
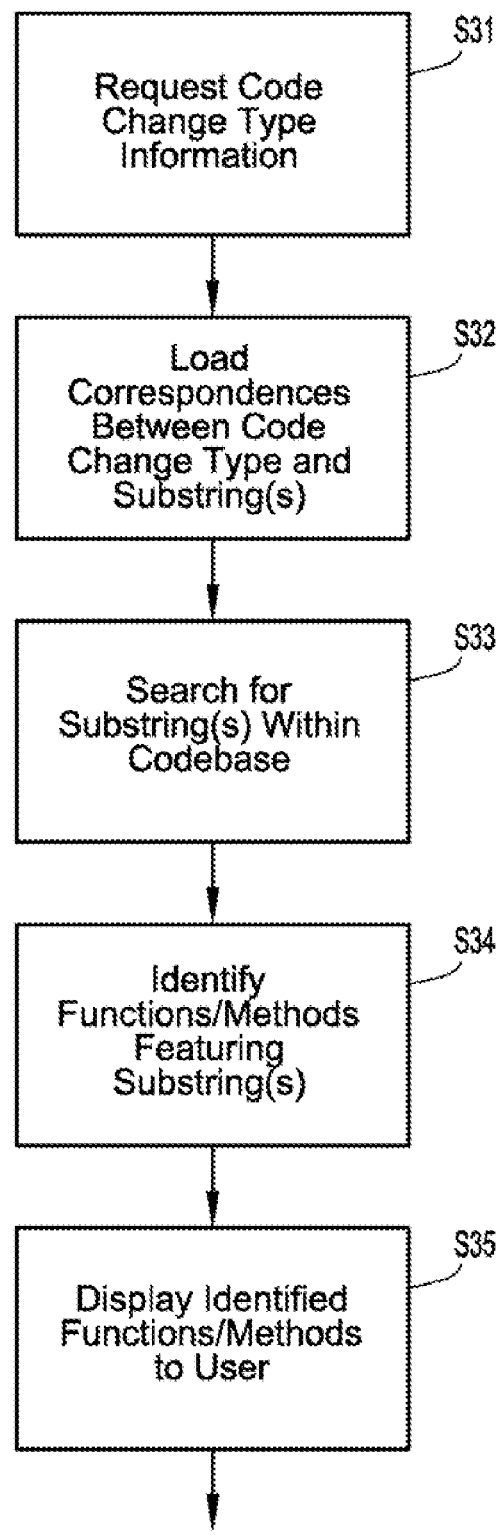
FIG. 3 is a flowchart illustrating performance of code modification assistance according to an exemplary embodiment of the present invention.

Regardless of the manner in which the training sets were processed, exemplary embodiments of the present invention may utilize the insight gained from the training data to provide code modification assistance. FIG. 3 is a flowchart illustrating performance of code modification assistance according to an exemplary embodiment of the present invention. FIG. 1 is a diagram of a user interface element for performing code modification assistance according to an exemplary embodiment of the present invention. First, the user may be presented with a request for information pertaining to the code change type being performed (Step S31). This request may be provided as part of a text editor and/or programmer toolkit user interface element 10. For example, the programmer toolkit user interface element 10 may include a code change advisor window 12 showing a list of code change types. The user may select from the list of code change types, for example, by selecting the desired code change type using a mouse pointer 14.

Training data may be collected using the same user interface element as is used for providing code change assistance 10. Thus, code changes may simultaneously be assisted by exemplary embodiments of the present invention and code changes made may be used as training data for subsequent code changes. Thus in selecting the code change information type, the user may be simultaneously making this selection for the purpose of responding to the request for code change type information for providing assistance (Step S31) and for training (Step S21).

Correspondences between the selected code change type and substrings may be loaded (Step S32). These correspondences may have been recorded during prior training (Step S24). The functions and other code sections of the target project code may then be searched to identify one or more of the loaded substrings that are associated with the selected code change type (Step S33). A program code text editor window 11 may be displayed as part of the user interface element 10 and accordingly, the program code text editor may display the test of the program code. Then, as a result of the search (Step S33) one or more functions, methods, or other code sections may be identified as containing the substrings (Step S34). The functions, methods, or other code sections so identified may then be presented to the user (Step S35), for example, by highlighting the particular code section using an indicator element 15 and/or the name of the function may be listed in a listing of functions of interest 13. Thus the attention of the user may be focused on the portions of the code base that are likely to require particular attention in performing the migration or whatever code changes are being performed.

The code base that is analyzed for training and/or for assistance need not be source code. Exemplary embodiments of the present invention may also utilize binary (compiled) code and/or intermediate representations such as Java bytecode. As long as the code base is organized into named units such as functions or methods and that these names are human-understandable and not randomly assigned, the semantics of the code may be used to identify and highlight code sections to bring to the attention of the user/programmer.

A similar approach may be used to provide software testers with the names and/or locations of functions and other program elements that may be of particular interest during testing. For example, where it is determined that function "Get_time_limit(x,t)" is generally changed during the code change type that was performed, and that function was not altered during migration, this may be brought to the attention of the tester so that particular attention may be paid to testing function "Get_time_limit(x,t)." Accordingly, program elements that are generally changed during the particular code change type but happened not to be changed may be considered portions of high-concern.

Figure 4:
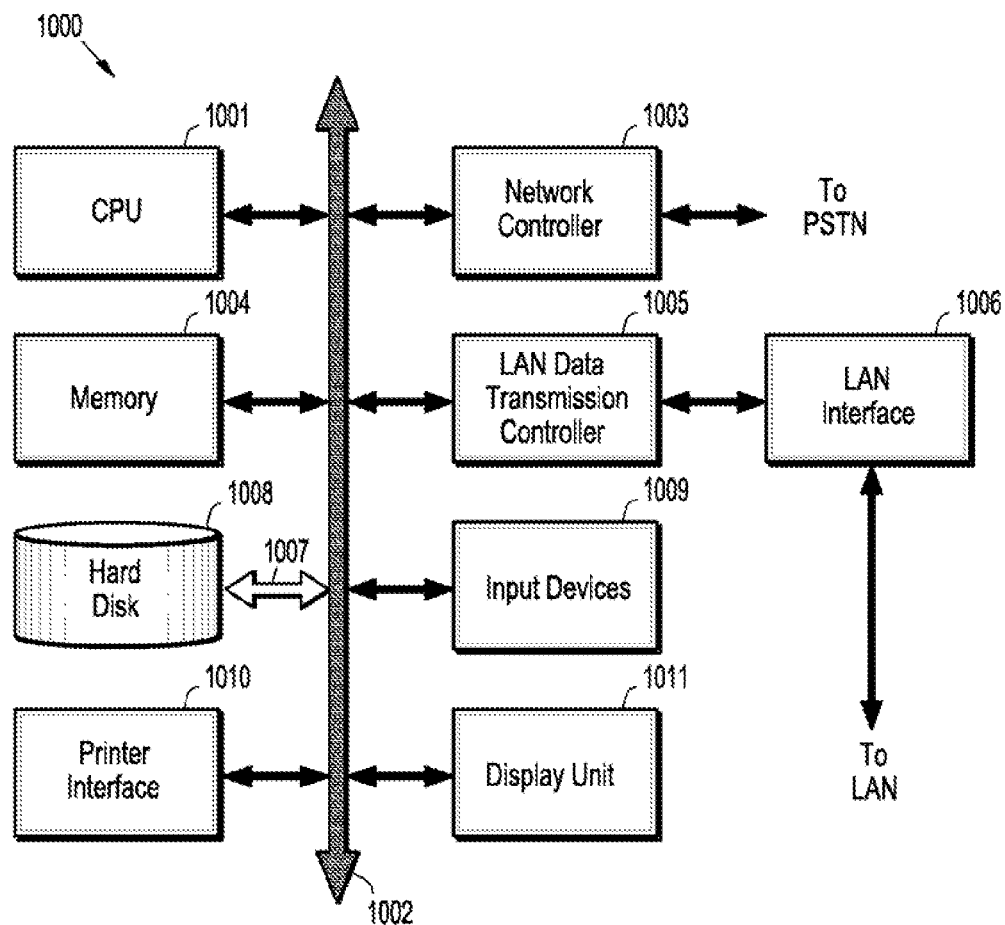
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

It is to be understood that the systems and methods described above may be implemented in various forms of hardware, software, firmware, special purpose processors, or a combination thereof. In particular, at least a portion of the present invention is preferably implemented as an application comprising program instructions that are tangibly embodied on one or more computer readable medium(s) (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The computer readable medium may be a computer readable transmission medium. Program code embodied on a computer readable transmission medium may be transmitted using any appropriate transmission medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing codebase modification assistance, comprising:
    receiving training data including at least one learning application code in two forms, the first form representing the learning application code prior to modification and the second form representing the same learning application code subsequent to modification, the modification being of a known type;
    detecting portions of the learning application code that have been changed by the modification by comparing the first form of the learning application code with the second form of the learning application code;
    identifying one or more substrings from names associated with the detected portions of the learning application code that have been changed;
    receiving a target application code that is to be modified according to the known type of modification of the training data;
    searching for the identified one or more substrings from names associated with portions of the received target application code; and
    displaying the portions of the target application code for which the identified one or more substrings have been found within the associated names with the portions of the target application code.

2. The method of claim 1, wherein the known type of the modification is a migration of application code for execution on a first platform to application code for execution on a second platform different from the first platform.

3. The method of claim 1, wherein the known type of modification is a reworking of application code to allow for parallel execution of application code sections.

4. The method of claim 1, wherein the known type of modification is a reworking of application code to provide for protection against a particular security threat.

5. The method of claim 1, wherein receiving the training data includes:
    receiving the learning application code in the first form;
    saving a copy of the received learning application code in the first form;
    displaying the learning application code in the first form to a user,
    permitting the user to modify the learning application code; and
    saving a copy of the learning application code as-modified as second form of the learning application code.

6. The method of claim 5, wherein the user is prompted to provide a description of the type of modification being performed and the user's description of the type of modification being performed is recorded and in this way the modification type is known.

7. The method of claim 1, wherein the detected portions of the learning application code that have been changed include one or more functions and the names associated with the one or more functions are function names.

8. The method of claim 1, wherein the target application code is received by a programming environment that also receives the training data and the portions of the target application code for which the identified one or more substrings have been found within the associated names with the portions of the target application code are displayed within the same programming environment.

9. The method of claim 1, wherein the receiving of the training data, the detecting of portions of the learning application code that have been changed, and the identification of the substrings are performed by a computer learning module and the target application code is received by a programming environment that also performs the searching for the identified one or more substrings and the displaying of the portions of the target application code,
    wherein the programming environment receives a list of the identified substrings associated with the portions of the learning application code that have been changed along with a description of the known type of modification from the learning module.

10. The method of claim 1, wherein displaying of the portions of the target application code for which the identified one or more substrings have been found within the associated names with the portions of the target application code includes providing a list of the names associated with the portions of the target application code within which the one or more substrings have been found.

11. The method of claim 10, wherein the names include function names and the associated portions of the target application code include functions.

12. The method of claim 1, wherein displaying of the portions of the target application code for which the one or more substrings have been found within associated names includes highlighting or otherwise accenting the portions of the target application code for which the identified one or more substrings have been found within the associated names with the portions of the target application code within a display of the text of the target application code.

13. The method of claim 1, wherein the training data and the target application code include source code.

14. The method of claim 1, wherein the training data and the target application code include compiled binary code.

15. The method of claim 1, wherein the training data and the target application code include intermediate representation code.

16. A method for providing codebase modification assistance, comprising:
- loading learning application code into a text editor;
- receiving a description of a type of code change to be performed on the loaded learning application code by a user;
- recording which portions of the learning application code are changed by the user as the user implements the code change of the described type;
- identifying one or more characteristics of the portions of the learning application code that are changed by the user as the user implements the code change of the described type;
- receiving a target application code that is to be changed according to the type of code change that the user implemented on the learning application code; and
- identifying and displaying portions of the target application code that exhibit the one or more identified characteristics.

17. The method of claim 16, wherein the type of code change is a migration of code from a first platform to a second platform different from the first platform, a reworking of code to allow for parallel execution of code threads, or a reworking of code to provide for protection against a particular security threat.

18. The method of claim 16, wherein identifying the one or more characteristics of the portions of the learning application code that are changed by the user includes identifying one or more substrings from names associated with the portions of the learning application code that are changed by the user and identifying portions of the target application code that exhibit the one or more identified characteristics include finding the one or more substrings within names associated with portions of the target application code.

19. The method of claim 16, wherein displaying the one or more portions of the target application code that exhibits the one or more identified characteristics includes highlighting or otherwise accenting the portions of the target code that exhibits the one or more identified characteristics within a display of the text of the target application code.

20. A computer program product for providing codebase modification assistance, said computer program product comprising:
- a computer readable storage medium;
- program instructions for loading learning application code into a text editor;
- program instructions for receiving a description of a type of code change to be performed on the loaded learning application code by a user;
- program instructions for recording which portions of the learning application code are changed by the user as the user implements the code change of the described type;
- program instructions for identifying one or more substrings from names associated with the detected portions of the learning application code that have been changed by the user;
- program instructions for receiving a target application code that is to be modified according to the type of code change that the user implemented on the learning application code;
- program instructions for searching for the identified one or more substrings from names associated with portions of the received target application code; and
- program instructions for displaying the portions of the target application code for which the identified one or more substrings have been found within the associated names with the portions of the target application code.

* * * * *